United States Patent
Firth et al.

(10) Patent No.: US 9,990,791 B2
(45) Date of Patent: Jun. 5, 2018

(54) SMART LOCKBOX

(71) Applicants: Matthew Firth, Long Beach, CA (US); Casper Wypych, Los Angeles, CA (US); Soroush Pourreza, Los Angeles, CA (US)

(72) Inventors: Matthew Firth, Long Beach, CA (US); Casper Wypych, Los Angeles, CA (US); Soroush Pourreza, Los Angeles, CA (US)

( * ) Notice: Subject to any disclaimer, the term of this patent is extended or adjusted under 35 U.S.C. 154(b) by 0 days. days.

(21) Appl. No.: 14/971,817

(22) Filed: Dec. 16, 2015

(65) Prior Publication Data

US 2017/0178434 A1 Jun. 22, 2017

(51) Int. Cl.
*G07C 9/00* (2006.01)
*H04L 29/06* (2006.01)
*H04M 1/725* (2006.01)
*H04W 12/04* (2009.01)

(52) U.S. Cl.
CPC ..... *G07C 9/00309* (2013.01); *G07C 9/00023* (2013.01); *G07C 9/00031* (2013.01); *G07C 9/00103* (2013.01); *G07C 9/00896* (2013.01); *H04L 63/08* (2013.01); *H04M 1/7253* (2013.01); *H04M 1/72527* (2013.01); *H04W 12/04* (2013.01); *G07C 2009/00507* (2013.01); *G07C 2009/00936* (2013.01)

(58) Field of Classification Search
CPC ............ G07C 9/00023; G07C 9/00103; G07C 9/00309; G07C 9/00031; G07C 2009/00936; G07C 2009/00507; G07C 9/00896; E05B 19/0005; H04W 8/265; H04W 12/06; H04W 12/08; H04W 12/04; H04L 63/08; H04M 1/72527; H04M 1/7253
USPC ........................................................ 340/5.73
See application file for complete search history.

(56) References Cited

U.S. PATENT DOCUMENTS

| | | | |
|---|---|---|---|
| 6,989,732 B2 * | 1/2006 | Fisher | G07C 9/00103 109/45 |
| 7,009,489 B2 * | 3/2006 | Fisher | G07C 9/00103 235/382 |
| 7,734,068 B2 * | 6/2010 | Fisher | E05B 19/0005 382/115 |

(Continued)

FOREIGN PATENT DOCUMENTS

| | | |
|---|---|---|
| EP | 1981003 A1 | 10/2008 |
| EP | 286366 A1 | 4/2015 |

(Continued)

*Primary Examiner* — Ali Neyzari

(57) ABSTRACT

The lockbox contains a microcomputer used in the processes of validating preapproved credentials. One method of obtaining access to the lockbox is by user carrying only an identification card, the lockbox scanning the identification card and transmitting its data to the lockbox's server for validation via an internal cell phone modem's connection through cell towers. The lockbox is also capable of capturing video and audio recordings, storing and categorizing the recordings into data such as traffic or noise levels over varying periods of time; and such data can be transferred to a user's cell phone upon the owner's approval. Additionally, the lockbox is powered by a solar panel power source, making it self-sustaining.

10 Claims, 6 Drawing Sheets

(56) References Cited

U.S. PATENT DOCUMENTS

| | | | | |
|---|---|---|---|---|
| 8,437,740 B2* | 5/2013 | Despain | ............... | A47G 29/10 340/5.73 |
| 8,451,088 B2* | 5/2013 | Fisher | ............... | A47G 29/10 340/5.73 |
| 8,756,431 B1* | 6/2014 | Despain | ............... | G06F 21/305 713/155 |
| 9,208,466 B2* | 12/2015 | Fisher | ............... | G06Q 10/08 |
| 2004/0219903 A1 | 11/2004 | Despain | | |

FOREIGN PATENT DOCUMENTS

| | | |
|---|---|---|
| WO | 2006098690 A1 | 9/2006 |
| WO | 2013078561 | 6/2013 |

\* cited by examiner

SMART LOCKBOX

BACKGROUND

Field of the Invention

The invention relates to the field of keys; accessories therefore/key safes, namely CPC E05B19/0005, CPC E05B49/00, CPC G07C9/00103, CPC G07C9/00309, CPC G07C9/00174.

The Problem to be Solved

There are two types of lockboxes: ones that are accessible only to real estate agents, and ones that are accessible to users. Problem at issue relates to a lockbox accessible to users so the following discussion only follows the development of such lockboxes.

Lockboxes have been developed with the sole purpose of providing access to locked premises that are unattended. Lockboxes contain a secured storage area for a key to a locked property, allowing access to authorized users. The locked property can be a home, or any other kind of property that is locked by a lock that requires a key. For mechanical lockboxes, users may be required to enter the correct combination password in order unlock the lockbox and gain access to the property.

Conventional electronic lockboxes have allowed users to communicate credentials to the lockbox by physically connecting to the lockbox via a wireless connection either provided by or in conjunction with the user's cell phone or via a local wireless network. Users have been required to communicate credentials attributed to the user's cell phone or other access device capable of providing such credentials. The electronic lockboxes have been able to connect wirelessly via short range wireless connections such as IrDA by using infrared signals generated by the user's access device as well as far field connections such as RF, Bluetooth, WIFI, etc. There has been a range of problems depending on the nature of the wireless connection. With shorter ranged connections, there are often concerns about batteries due to excessive power drainage when performing such connections or when the lockbox needs to wake from a sleep mode periodically to check for the availability of a user's cell phone. With the IrDA connection specifically, there is the concern of the line of sight alignment that is often inconvenient. With longer ranged connections, there are issues with security such as interference and the difficulty in addressing the desired lockbox among multiple lockboxes located in close proximity.

BRIEF SUMMARY

It would be desirable to provide a lockbox that provides wireless connection without concerns of power drainage, one that does not require a user to possess a cell phone or PDA in order to gain access to a locked property, and one that does more than provide a key to a user.

The illustrated embodiments include a lockbox for dispensing a key or other item to a user upon validation. The lockbox includes a locked storage area capable of being selectively unlocked, a circuit including a microcomputer, the circuit being communicated with the locked storage area and various other components of the lockbox, and a means for communicating with the circuit for selectively validating a user's credentials and dispensing the key or other item from the locked storage area to the user. The lockbox could also contain a wifi card and/or cell phone modem as part of its circuit.

The lockbox is further configured with a camera and recorder with video and audio capabilities, a server that the circuit connects to in order to validate a user's credentials, a scanner used to scan the barcode of a user's identification card and transmit the data to the lockbox's server via the circuit, a solar panel power source coupled with the entire device, and a USB slot affixed to the exterior of the device, allowing the device to be utilized as a charging station. The microcomputer is a credit card-sized single-board computer that stores and categorizes video and/or audio recordings from the camera, and sends recordings to the server for storage when it runs out of storage space. The microcomputer, cell phone modem, and wifi card are USB compatible.

The lockbox further includes batteries charged by solar panel cells and balanced by a solar balance charger, all coupled to the lockbox. It also contains a DC converter coupled with a USB slot accessible from exterior to the lockbox, allowing the lockbox to be utilized as a charging station, a GPS transmitter that periodically transmits the lockbox's location, and strings of LEDs all connected to the circuit and a light timer to illuminate the lockbox during selected hours.

The lockbox is operated when a user scanning his/her identification card and the lockbox transmitting the scanned data from the identification card via the circuit to the server for validation. Upon validation, the microcomputer sends a signal to the locked storage area to dispense a key or other stored item. The lockbox can also be operated by a user requesting access with the user's user's cell phone by connecting to the same Internet connection as the lockbox. The lockbox then communicates with the user's cell phone credentials via the circuit to the server for validation and upon validation, the microcomputer would send a signal to the locked storage area to dispense a key or other stored item upon validation of the user's preapproved cell phone credentials. Another method of operating the lockbox is a user holding any access device capable of communicating with the lockbox's microcomputer, the microcomputer recognizing that device as a valid and authorized device, and then sending a signal to the locked storage area to dispense the key or other stored item. The circuit being comprised of the microcomputer, and could also include a wifi card and/or cell phone modem.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The disclosure can be better visualized by turning now to the following drawings wherein like elements are referenced by like numerals.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Glossary

Figure 1:
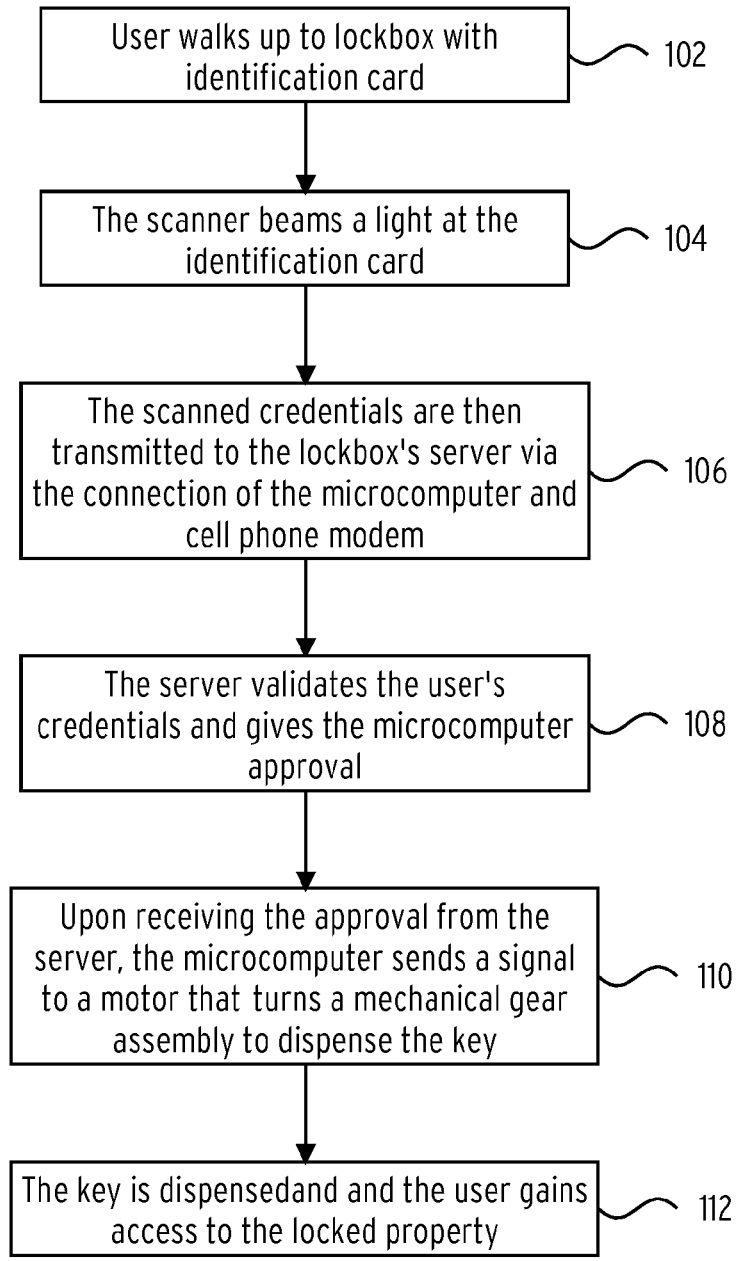
FIG. 1 is a flowchart which illustrates the steps taken to gain access to the locked property by use of an identification card.
Figure 2:
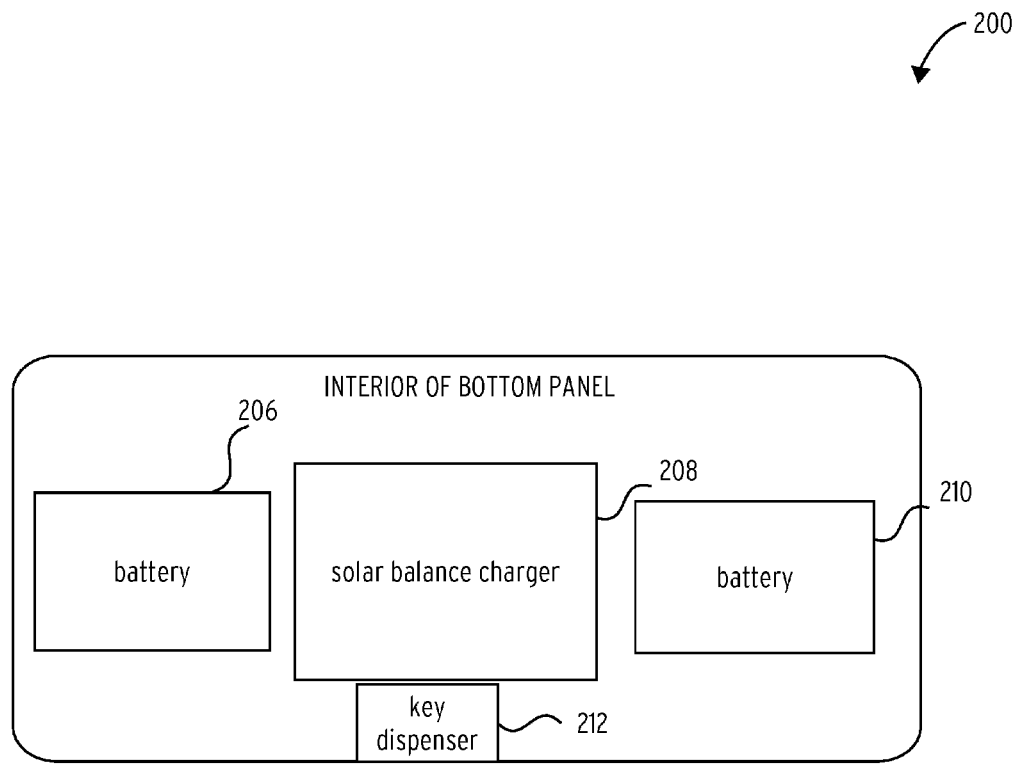
FIG. 2 is a diagram which illustrates the one way of operating the lockbox in granting access to the user by scanning an identification card in accordance with one embodiment.
Figure 3:
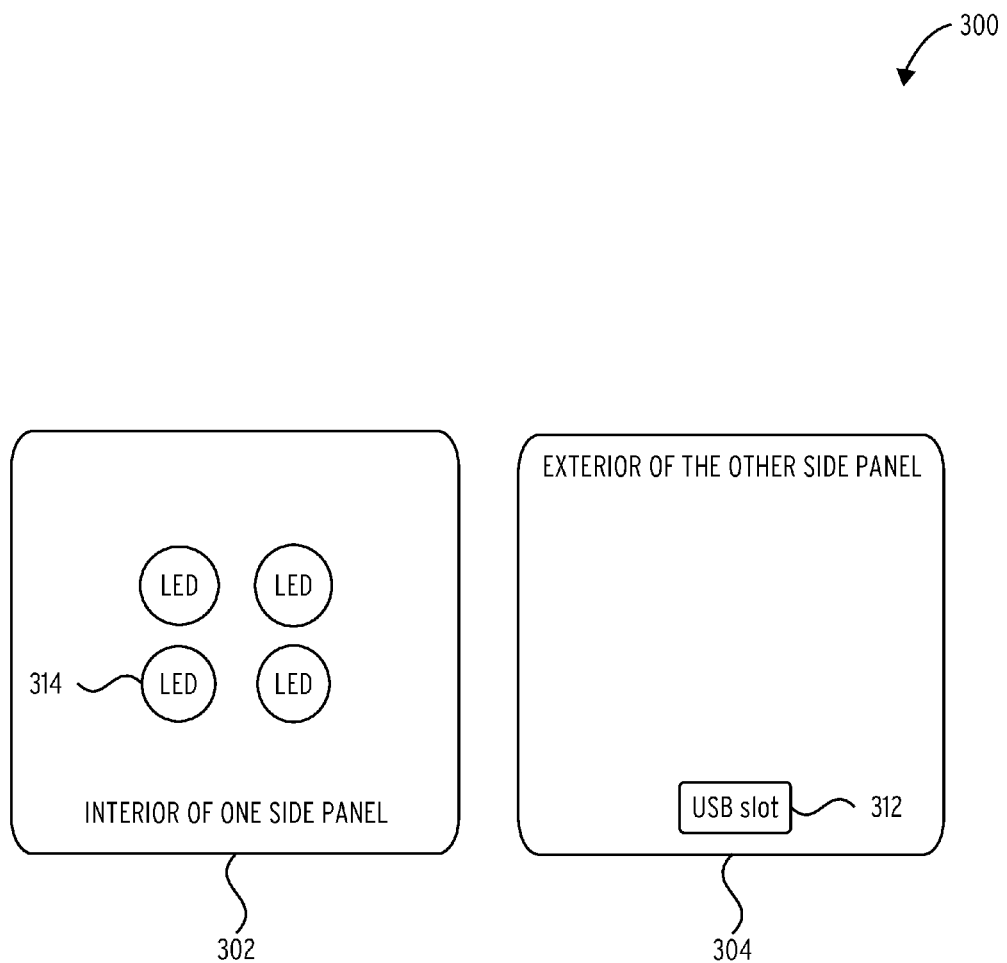
FIG. 3 is a diagram which illustrates the two side panels of the lockbox; one containing LEDs and the other containing the USB slot in accordance with one embodiment.
Figure 4:
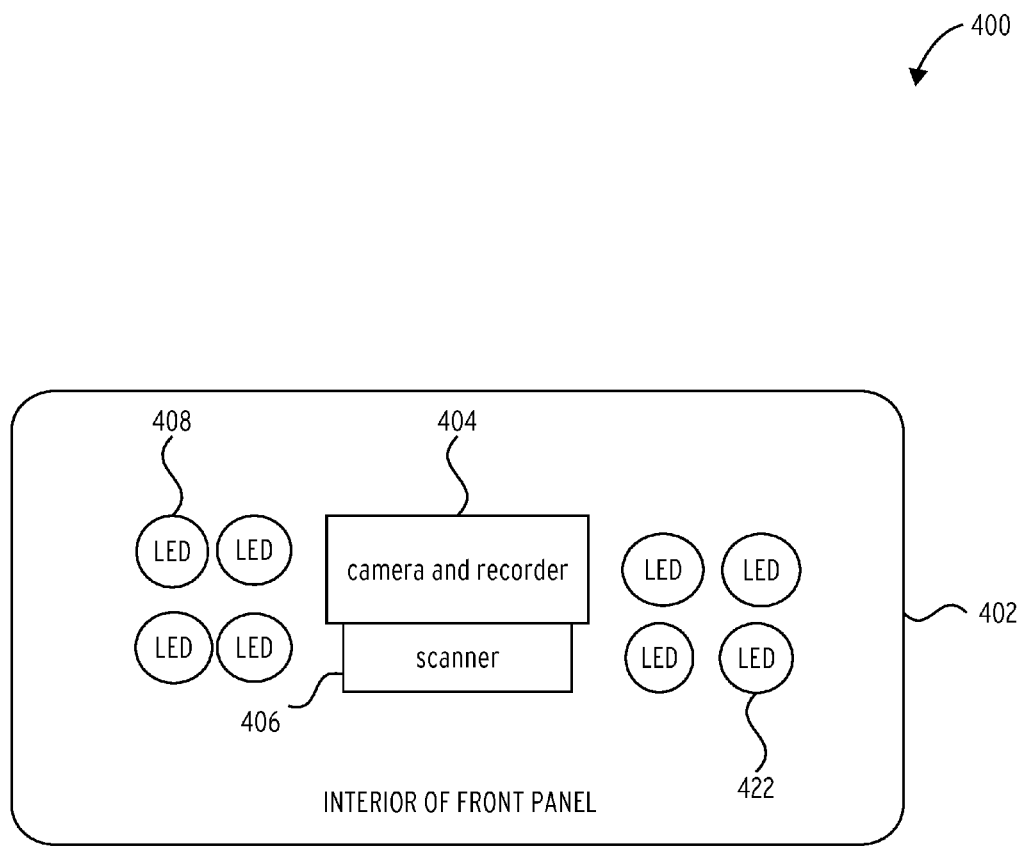
FIG. 4 is a diagram which illustrates a front facing view of the interior of the lockbox's front panel in accordance with one embodiment.
Figure 5:
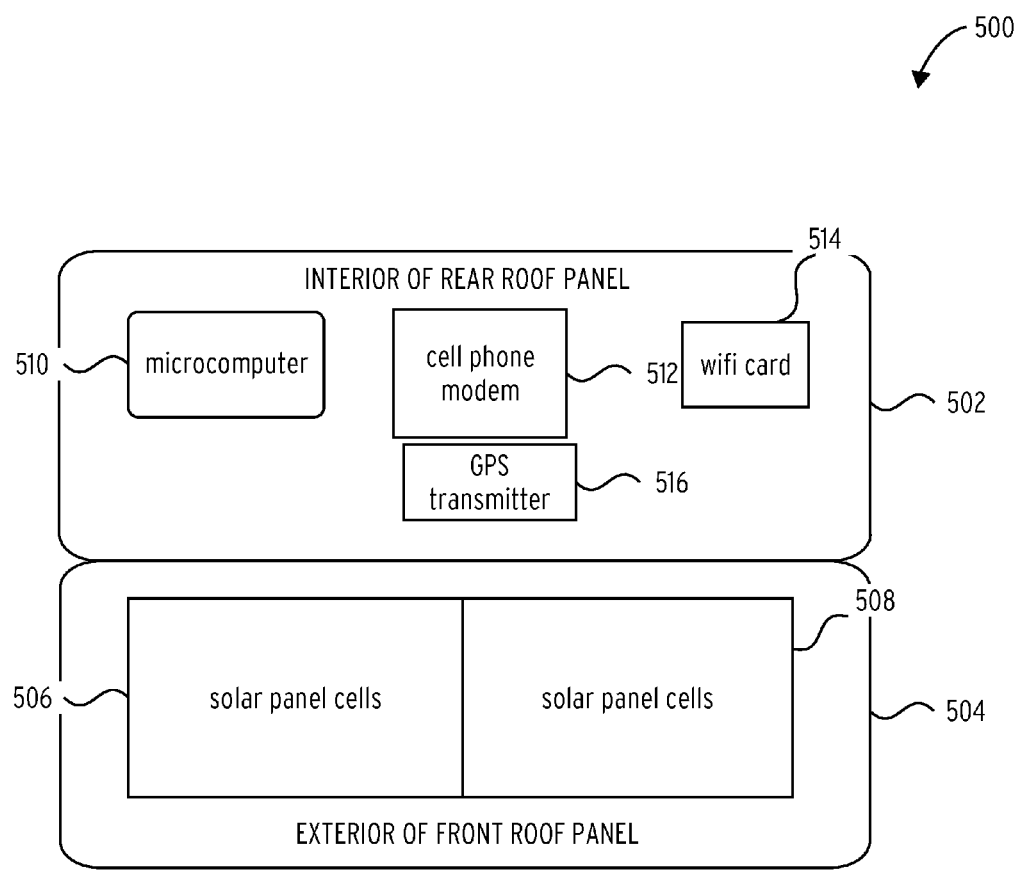
FIG. 5 is a diagram which illustrates a plain view of the interior of the lockbox's rear roof panel and exterior of the lockbox's front roof panel in accordance with one embodiment.
Figure 6:
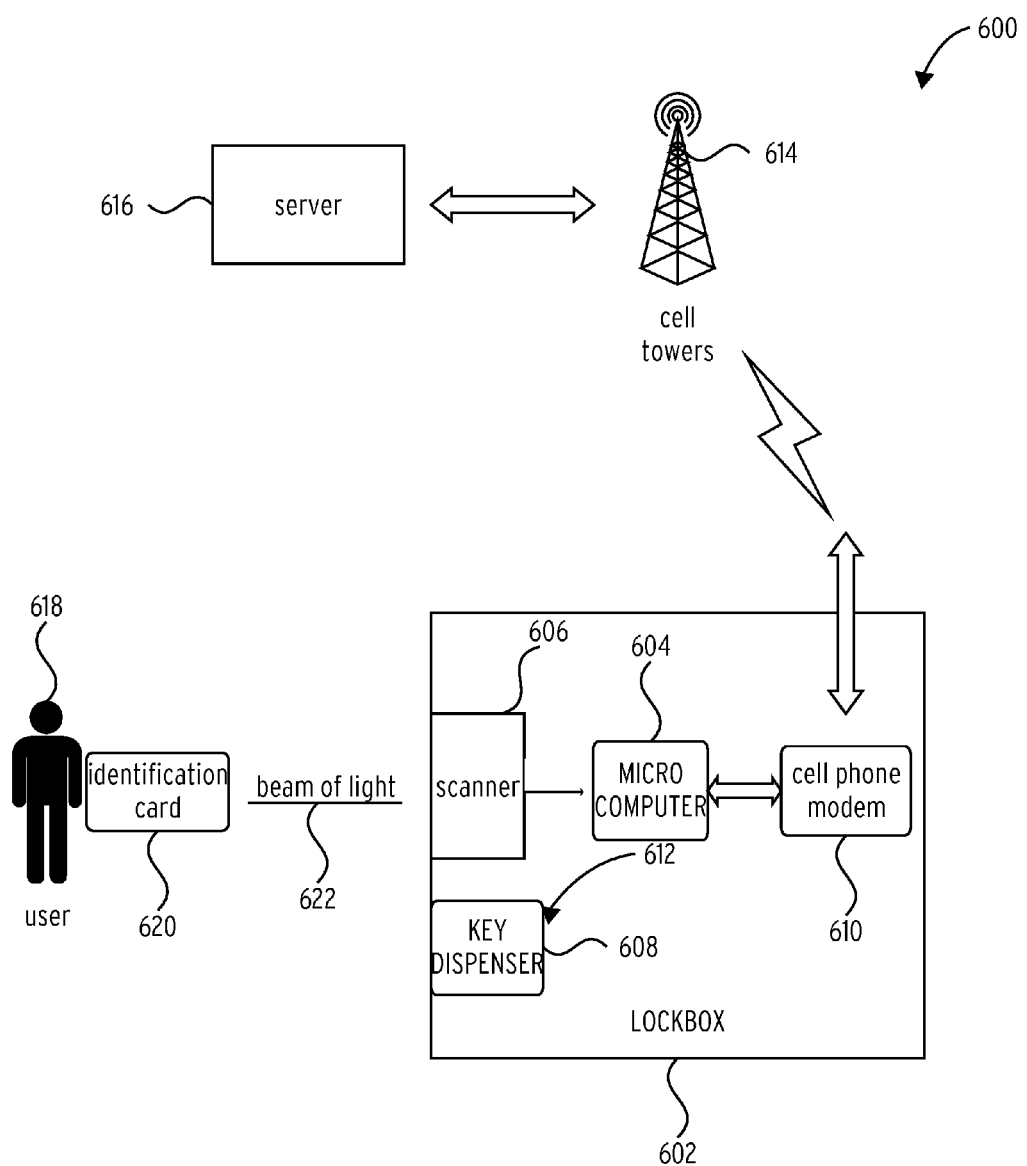
FIG. 6 is a diagram which illustrates a view of the interior of the lockbox's bottom panel of the lockbox in accordance with one embodiment The disclosure and its various embodiments can now be better understood by turning to the following detailed description of the preferred embodiments which are presented as illustrated examples of the embodiments defined in the claims. It is expressly understood that the embodiments as defined by the claims may be broader than the illustrated embodiments described below.

The glossary below is provided for clarity, but the defined terms do not exclude construction of the terms according to standard dictionaries, technical dictionaries, trade dictionaries or usages as established in related channels of trade and technology.

"Circuit" in this context refers to, but not limited to, the microcomputer and it could also include a cell phone modem and/or wifi card.

"Identification card" in this context refers to including, but not limited to, a state issued identification card, driver's license, and the like.

"Locked property" in this context refers to a property that can be opened by a key stored in the lockbox; such property can include, but is not limited to a dwelling, boat, shed, airplane, safe, a locked box, etc.

"Locked storage area" in this context refers to the interior space of the lockbox including the key dispenser but excluding the circuit, camera and recorder, solar balance charger, batteries, LEDs, light timer, and any other components of the lockbox.

"Solar panel power source" in this context refers to a system for a self-sustaining lockbox comprised of batteries, solar panel cells, and a solar balance charger.

"Access device" in this context refers to any device capable of communicating with the lockbox

DESCRIPTION

Disclosed below are representative embodiments of a lockbox 602 that should not be construed as limiting in any way. The disclosed technology is not limited to any specific aspect or feature, or combination thereof, nor do the disclosed methods and apparatus require that any one or more specific advantages be present or problems be solved.

Described below is a lockbox 202 that enables access to a key or other item (not shown) to an authorized user, in which the key or other item is stored in a locked area or key dispenser 208 within the lockbox 202 and is connected to and controlled by a microcomputer 204 that unlocks the item upon authorization. In one embodiment the size of the storage area is 18×11×8 inches in dimensions (essentially the entire interior space of the lockbox 202), limiting the size of a stored item to those dimensions. In one embodiment the key is dispensed in a container (not shown) with key dispenser 208 that stays attached to the lockbox 202 and the authorized user takes the key out of the container. In another embodiment the key would be attached and stay attached to a cable with sensors (not shown) communicated to microcomputer 204 to detect its severance from the lockbox 202.

The lockbox 202 is further comprised of a camera and recorder 404 with video and/or audio capabilities that records and categorizes the camera feed as downloadable data. In one embodiment the lockbox 202 is comprised of a circuit 502 containing a USB compatible microcomputer 204 (such as raspberry pi), cell phone modem 210, and wifi card 514. The circuit 502 is connected to the camera and recorder 404, the locked storage area and key dispenser 208, and communicated wirelessly through the cell phone network 214 with the lockbox's server 216. In one embodiment the lockbox 202 also includes two 12 volt batteries (battery 610 and battery 606) coupled with a solar balance charger 208 and four 6 volt solar panel cells 506, 508 on the roof 504 of the lockbox 602, creating a self-sustaining lockbox 202; a 12 volt GPS transmitter 516 that transmits its location every 2 to 24 hours as a way to track down the unit in case of theft; a 5 to 12 volt DC converter coupled with a female USB slot 312 affixed to the exterior of the lockbox 202 allowing users to utilize the device as a charging station; and strings of LEDs (LED 408, LED 314, LED 422) with transistor drivers (not separately shown) all coupled with a light timer (not shown) or microcomputer 204 allowing for the lockbox 202 to be illuminated during darkness. The transistors are wired in the LEDs to lower the overall power consumption of the lights. The lockbox 202 is further comprised of scanner 206 affixed to the front of the lockbox 202 that scans a user's identification card 220 by using a beam of light 222 reflected from the barcode of the user's identification card 620 similar to a conventional bar code scanner.

In one embodiment a user 218 can gain access to the key by walking up to the lockbox 602 with a valid identification card 220 is step 102 shown in the flowchart of FIG. 1 and placing it in front of the scanner 206 which scans the card 220 at step 104 and transmit its data at step 106 to the lockbox's server 216 through the microcomputer 204 and cell phone modem 210. The server 216 will then validate the user's preapproved credentials at step 108. Upon receiving validation from server 216, the microcomputer 204 sends a signal to a motor shield that controls a motor (signal indicated by arrow 212), which turns a mechanical gear assembly to dispense the key at steps 110, 112. In another embodiment the lockbox 202 can also validate the user's cell phone credentials using the microcomputer 204 and cell phone modem 210 to connect to the lockbox's server 216 where the preapproved credentials are validated. In either of these embodiments, when the key dispenser is unlocked, the rest of the locked storage area is also unlocked and the side panel of the lockbox 202 can be opened in a manner similar to that of a mailbox, to give access to any other items the owner may have stored for the user 218. Also in either of these embodiments the lockbox 202 can connect to the server 216 using the internet connection provided through the wifi card 214 as well through an accessible internet access point within range. In another embodiment the user 218 could walk up to the lockbox with a preapproved access device capable of communicating with the lockbox, the microcomputer 204 would recognize the valid and authorized credentials of the device and send a signal to a motor shield that controls a motor (signal indicated by arrow 212), which turns a mechanical gear assembly to dispense the key.

The microcomputer 204 of the lockbox 202 acts as a digital storage system and is coupled with the small camera and recorder 404, which includes a microphone and speaker system, allowing digital recording and play back. The stored recordings can be categorized into data such as traffic or noise levels over varying periods of time. The lockbox 202 can transmit the stored data to a user's cell phone if the owner of the lockbox 202 authorizes such data transfer. The USB compatibility of the microcomputer 204 allows for the wide array of sensors and transmitters such as the scanner 206 used to read and transmit the information on a user's identification card 220.

The cell phone modem 210 provides the capability of connecting to the internet through cell towers 214, providing connections such as 3G or 4G. In one embodiment the lockbox 202 is also wifi-enabled as the wifi card 514 allows the lockbox 202 to be connected to a local wireless network. The wifi card is also capable of providing the lockbox 202 with its own wifi network, allowing for the lockbox 202 to be used as a wifi hub and hotspot. These connections to the internet being means by which the circuit communicates with the camera and recorder 404, server 216, and the user's cell phone (not shown) to carry out the functions of the lockbox 202.

Many alterations and modifications may be made by those having ordinary skill in the art without departing from the spirit and scope of the embodiments. Therefore, it must be understood that the illustrated embodiment has been set forth only for the purposes of example and that it should not be taken as limiting the embodiments as defined by the following embodiments and its various embodiments.

Therefore, it must be understood that the illustrated embodiment has been set forth only for the purposes of example and that it should not be taken as limiting the embodiments as defined by the following claims. For example, notwithstanding the fact that the elements of a claim are set forth below in a certain combination, it must be expressly understood that the embodiments includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the embodiments is explicitly contemplated as within the scope of the embodiments.

The words used in this specification to describe the various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the embodiments.

What is claimed is:

1. A lockbox for dispensing a key or other item to a user upon validation of a user's credentials comprising:
   a locked storage area capable of being selectively unlocked;
   a circuit including a microcomputer, the circuit being communicated with the locked storage area and other various components of the lockbox;
   a dispenser of the key or other item from the locked storage area to the user, the dispenser being coupled to the circuit;
   means for communicating with the lockbox for selectively validating preapproved credentials to grant access to the locked storage area;
   a camera and recorder capable of video and/or audio data capture;
   a scanner;
   one or more batteries;
   a solar panel power source coupled with the battery(ies);
   a remote server communicated with the microcomputer and cell phone modem in order to validate the user's credentials; and
   an exteriorly accessible USB slot affixed to the lockbox, allowing the lockbox to be utilized as a charging station.

2. The lockbox of claim 1, wherein the microcomputer is a credit card-sized single-board computer.

3. The lockbox of claim 1, wherein the microcomputer stores and categorizes video and/or audio recordings from the camera as data, and sends the data to the remote server for storage when the microcomputer runs out of storage space; and where the data can be transferred to a user's cell phone, if such transfer is authorized by the owner of the lockbox.

4. The lockbox of claim 1, wherein the camera comprises a miniature USB camera containing a recorder, microphone and speaker system.

5. The lockbox of claim 1, further comprising solar panel cell(s), a solar balance charger coupled to the solar panel cell(s), and battery(ies) coupled to the solar balance charger.

6. The lockbox of claim 1, further comprising a USB slot accessible from exterior to the lockbox and DC-to-DC converter coupled with the USB slot, allowing the lockbox to be utilized as a charging station.

7. The lockbox of claim 1, further comprising a GPS transmitter coupled to the circuit to periodically transmit the lockbox's location.

8. The lockbox of claim 1, further comprising:
   a plurality of LEDs all connected to the circuit; and
   a light timer coupled to the LEDs to illuminate the lockbox during selected hours.

9. The lockbox of claim 1, further comprising a cell phone modem and/or wifi-card included within the circuit.

10. The lockbox of claim 9, wherein the microcomputer, cell phone modem, and wife card are USB are coupled together through USB couplings.

\* \* \* \* \*